United States Patent
Fee

[11] Patent Number: 5,884,017
[45] Date of Patent: Mar. 16, 1999

[54] METHOD AND SYSTEM FOR OPTICAL RESTORATION TRIBUTARY SWITCHING IN A FIBER NETWORK

[75] Inventor: John Arthur Fee, Plano, Tex.

[73] Assignee: MCI Communications Corporation, Washington, D.C.

[21] Appl. No.: 582,846

[22] Filed: Dec. 29, 1995

[51] Int. Cl.$^6$ ............................................. G06F 11/34
[52] U.S. Cl. .......................... 395/182.02; 340/825.01; 370/217
[58] Field of Search .................. 395/182.02; 371/8.1, 371/8.2; 370/216, 217, 219, 221, 225, 227, 242, 244; 340/825, 825.01, 825.03

[56] References Cited

U.S. PATENT DOCUMENTS

| | | | |
|---|---|---|---|
| 4,451,916 | 5/1984 | Casper et al. | 395/182.02 |
| 4,527,270 | 7/1985 | Sweeton | 395/184.01 |
| 4,542,502 | 9/1985 | Levinson et al. | 370/403 |
| 4,560,246 | 12/1985 | Cotter . | |
| 4,561,119 | 12/1985 | Epworth . | |
| 4,596,982 | 6/1986 | Bahr et al. | 340/825.05 |
| 4,704,714 | 11/1987 | Tomizawa et al. | 370/224 |
| 4,745,597 | 5/1988 | Morgan et al. | 370/224 |
| 4,763,315 | 8/1988 | Nakayashiki et al. | 370/227 |
| 4,768,190 | 8/1988 | Giancarlo | 370/400 |
| 4,797,589 | 1/1989 | Collins | 370/63 |
| 4,821,255 | 4/1989 | Kobrinski . | |
| 4,831,662 | 5/1989 | Kuhn | 359/156 |
| 4,845,736 | 7/1989 | Posner et al. | 379/27 |
| 4,866,699 | 9/1989 | Brackett et al. . | |
| 4,887,256 | 12/1989 | Nakayashiki et al. | 370/224 |
| 4,956,835 | 9/1990 | Grover . | |
| 4,964,095 | 10/1990 | Tyrrell et al. | 370/221 |
| 5,058,105 | 10/1991 | Mansour et al. | 370/228 |
| 5,069,521 | 12/1991 | Hardwick | 385/24 |
| 5,081,452 | 1/1992 | Cozic | 340/825.5 |
| 5,091,902 | 2/1992 | Chopping et al. | 370/223 |
| 5,166,821 | 11/1992 | Huber . | |
| 5,179,548 | 1/1993 | Sandesara | 370/222 |
| 5,182,744 | 1/1993 | Askew et al. | 370/16 |
| 5,200,964 | 4/1993 | Huber . | |
| 5,218,465 | 6/1993 | Lebby et al. | 359/110 |
| 5,271,075 | 12/1993 | Gfeller et al. | 385/20 |
| 5,299,293 | 3/1994 | Mestdagh et al. | 359/110 |
| 5,327,427 | 7/1994 | Sandesara | 370/222 |
| 5,329,392 | 7/1994 | Cohen | 359/124 |
| 5,329,396 | 7/1994 | Fishman et al. . | |
| 5,329,520 | 7/1994 | Richardson | 370/225 |
| 5,333,130 | 7/1994 | Weissman et al. | 370/221 |
| 5,341,364 | 8/1994 | Marra et al. | 370/223 |
| 5,343,464 | 8/1994 | Iino et al. | 370/227 |
| 5,359,450 | 10/1994 | Ramachandran et al. . | |
| 5,365,510 | 11/1994 | Nocholson et al. | 370/222 |
| 5,373,383 | 12/1994 | LaGasse . | |
| 5,373,385 | 12/1994 | Darcie et al. . | |
| 5,396,357 | 3/1995 | Goossen et al. | 359/119 |
| 5,420,868 | 5/1995 | Chraplyvy et al. . | |
| 5,434,691 | 7/1995 | Yamane | 359/117 |
| 5,442,472 | 8/1995 | Skrobko | 359/110 |
| 5,442,623 | 8/1995 | Wu | 370/16.1 |
| 5,446,725 | 8/1995 | Ishiwatari | 370/222 |
| 5,452,115 | 9/1995 | Tomioka | 359/123 |

(List continued on next page.)

FOREIGN PATENT DOCUMENTS

| | | | |
|---|---|---|---|
| 0359352 A3 | 3/1990 | European Pat. Off. | H04J 3/08 |
| 0449475 A2 | 10/1991 | European Pat. Off. | H04B 10/08 |
| 0 507 379 A | 10/1992 | European Pat. Off. | H04B 10/00 |
| 0 620 694 A2 | 10/1994 | European Pat. Off. | H04Q 11/00 |
| 0 721 275 A2 | 7/1996 | European Pat. Off. | H04Q 3/66 |
| 2 233 851 | 1/1991 | United Kingdom | H04B 10/08 |

*Primary Examiner*—Albert Decady

[57] ABSTRACT

A method and system for restoration of a fiber communication network through optical tributary switching. Multi-port optical cross-switches switch traffic at the tributary side of lightwave terminal equipment in the event of a network failure. Optical tributary switching is implemented in a variety of all-optical core network architectures including separate disjoint path, link-based mesh, and path-based mesh configurations. Network resiliency is enhanced without introducing loss over a high-speed fiber line or trunk.

20 Claims, 5 Drawing Sheets

U.S. PATENT DOCUMENTS

| | | | |
|---|---|---|---|
| 5,457,555 | 10/1995 | Moriyama | 359/110 |
| 5,457,556 | 10/1995 | Shiragaki | 359/117 |
| 5,459,715 | 10/1995 | Furuta et al. | 370/16 |
| 5,479,608 | 12/1995 | Richardson | 359/182.02 |
| 5,495,471 | 2/1996 | Chow et al. | 370/16 |
| 5,517,489 | 5/1996 | Ogura | 370/223 |
| 5,602,828 | 2/1997 | Engdahl et al. | 370/228 |
| 5,625,478 | 4/1997 | Doerr et al. | 359/125 |
| 5,647,035 | 7/1997 | Cadeddu et al. | 385/24 |
| 5,680,235 | 10/1997 | Johansson | 359/110 |

METHOD AND SYSTEM FOR OPTICAL RESTORATION TRIBUTARY SWITCHING IN A FIBER NETWORK

BACKGROUND OF THE INVENTION

CROSS-REFERENCE TO OTHER RELATED APPLICATIONS

This patent application is potentially related to the following commonly owned, copending applications:

1. "Method and System for Detecting Optical Faults Within the Optical Domain of a Fiber Communication Network," Ser. No. 08/580,391 by Shoa-Kai Liu, filed on Dec. 28, 1995, and incorporated herein by reference;
2. "System and Method for Photonic Facility and Line Protection Switching," Ser. No. 08/575,663, now U.S. Pat. No. 5,731,887, by John A. Fee, filed on Dec. 22, 1995, and incorporated herein by reference; and
3. "Method and System for Detecting Optical Faults in a Network Fiber Link," Ser. No. 08/582,845, Attorney Docket No. 15675.0520000, by John A. Fee, filed concurrently herewith, and incorporated herein by reference.

1. Field of the Invention

The present invention relates generally to fiber optic telecommunication. More particularly, the present invention pertains to all-optical core network restoration.

2. Related Art

A communications network serves to transport information among a number of locations. The information to be transported is usually presented to the network in the form of time-domain electrical signals representing a combination of telephony, video, or computer data in a variety of formats. To transport such information, a typical communications network consists of various physical sites, and information conduits, called "links", that interconnect the sites. Each link serves to carry information from one site to another site. Each site or node may contain equipment for combining, separating, transforming, conditioning, and routing the information signals.

The traffic of even a single link represents a formidable volume of vital information flow—equivalent to tens of thousands of phone calls. Sudden failure of a link can cause a significant loss in revenues for a network owner and loss of commerce and other benefits for the network subscribers. Consequentially, restoration techniques have been devised to circumvent failure and restore normal traffic flow as quickly as possible.

Optical fibers are increasingly relied upon for carrying vital communications traffic. Fiber trunks extend between nodes (i.e. cities) forming networks extending across cities, states, nations, and continents. Fiber cables whether laid out above ground, underground, or underwater are subject to damage. For example, lightning, backhoes, fires, train derailment, trawler nets, and shark attacks have been reported to have severed or impaired optical fiber connectivity. See, Grover, Wayne PhD., "Distributed Restoration of the Transport Network," *Network Management into the 21st Century*, Chapter 11, IEEE Press (1994), p 337.

Fiber optic cables carry far greater amounts of digital data than conventional electrical cables. A single fiber operating at 1.2 Gb/s and packeting data according to a standard SONET OC-24 protocol, carries the equivalent of over 16,000 voice circuits. Future fiber demands project over 130,000 callers per fiber. In an OC-192 wavelength-division multiplexing scheme, eight wavelengths are available to carry a data volume equivalent to over one million voice calls in a single fiber! Moreover, dozens of fibers may be included in a single cable. The impact of a cable cut, or even a single optical fiber or nodal failure, can be widespread. Fiber network survivability has become critical to implementing an effective fiber communication.

To avoid susceptibility to a single point failure, sophisticated networks include redundant fibers, called protect or back-up fibers, to link nodes. Optical line switches have also been proposed to switch the flow of optical data traffic from the working fiber to the protect fiber in the event of a detected failure along the working fiber. See, e.g., the diverse protect fiber network architecture described by Wu et al., "Strategies and Technologies for Planning a Cost-Effective Survivable Fiber Network Architecture Using Optical Switches," CH2655-9 I.E.E.E., pp. 749–55, (1989) (incorporated by reference herein).

Optical switches, however, introduce significant loss. The actual loss varies by switch technology. An optical signal passing through Integrated Lithium-Niobate switches, such as the 4×4 switch made by NEC, loses approximately six decibels. Furthermore, the magnitude of the loss suffered by a system, generally increases with port count. A 128×128 NEC switch introduces a 50 db. loss! Such loss reduces the long-distance range of the fiber link.

What is needed is an all-optical restoration system and method whereby data can be re-routed through optical switching in the event of fiber failure or other system error without introducing line loss.

SUMMARY OF THE INVENTION

The present invention provides a method and system for restoration of a fiber communication network through optical tributary switching. Optical tributaries are used as inputs to Lightwave or Line Terminal Equipment (LTE). The LTE multiplexes multiple slower bit-rate signals received through the tributaries into a faster bit-rate signal for transmission over a fiber link.

According to the present invention, protect fibers are introduced at the tributary side of line terminal equipment. Multi-port optical cross-connect tributary switches are further included for switching between working and protect fibers at the tributary side of LTE equipment. Optical switches on a tributary side have increased ports compared to the line side switches resulting in even greater loss. Optical loss at the tributary side, however, is easily controlled. Tributary fibers are typically short and self-contained within a central office node. Signal loss from optical switches at the tributary side does not impact line side signals, because the LTE multiplexes and re-generates a high-speed optical signal.

The present invention implements network restoration through optical tributary switching in a variety of all-optical core network architectures. In particular, separate disjoint path, link-based mesh, and path-based mesh configurations are described. Restoration in each configuration can be achieved through space and/or wavelength switching.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art make and use the invention.

In the drawings.

Figure 1:
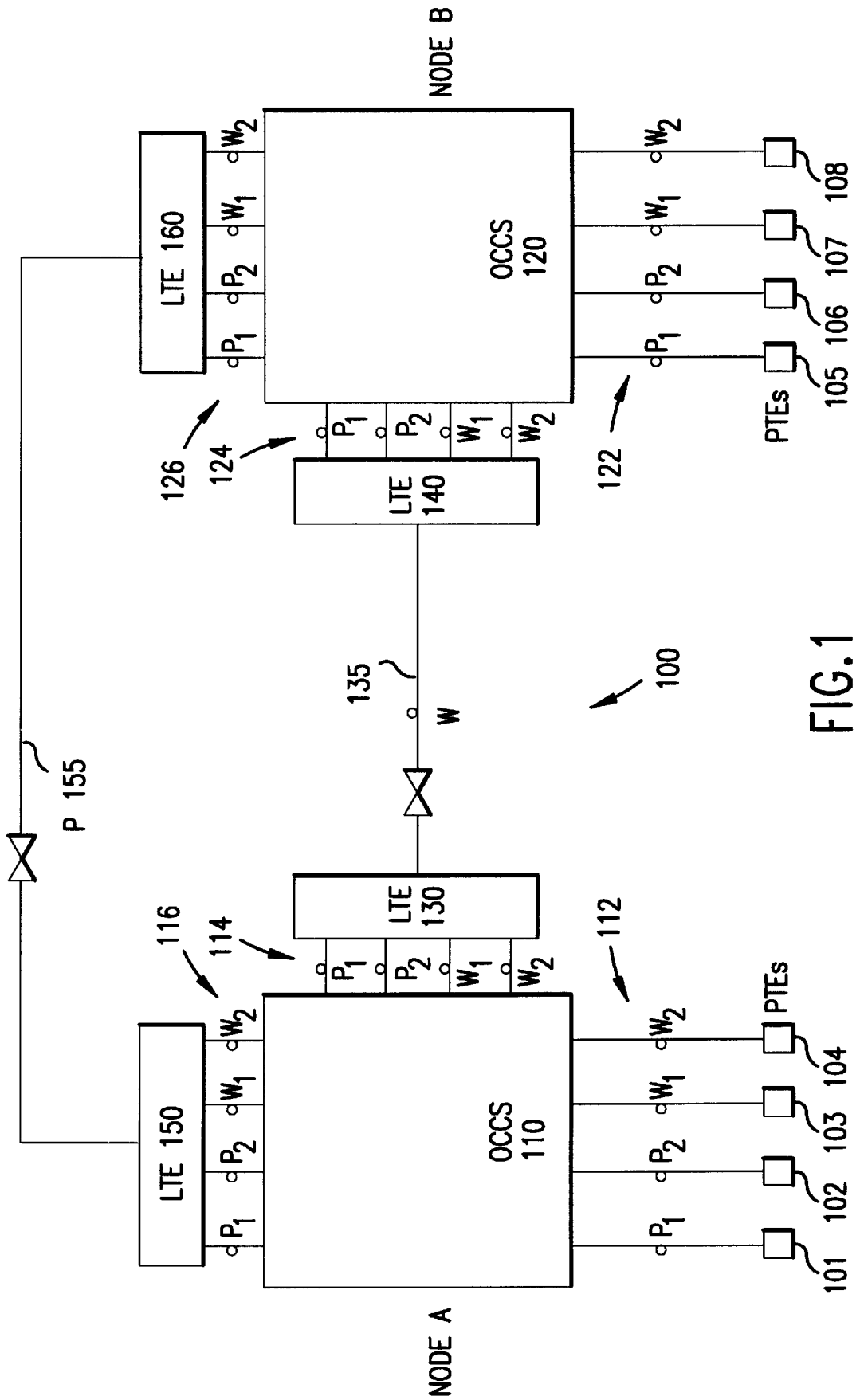
FIG. 1 is a block diagram of a separate path network configuration having optical tributary restoration switching according to the present invention.

The present invention will now be described with reference to the accompanying drawings. In the drawings, like reference numbers indicate identical or functionally similar elements. Additionally, the left-most digit(s) of a reference number typically identifies the drawing in which the reference number first appears.

DETAILED DESCRIPTION OF THE FIGURES

TABLE OF CONTENTS

I. Overview
II. Example Environment
III. Separate Path
IV. Link-Based Mesh Restoration
 A. Link Mesh Space
 B. Link Mesh Wavelength
V. Path-Based Mesh Restoration
 A. Path Mesh Space
 B. Path Mesh Wavelength
VI. Conclusion I. Overview The present invention provides a method and system for restoration of a fiber communication network through optical tributary switching. In the event of a network failure, multi-port optical cross-connect switches switch traffic between working and protection fibers at the tributary side of LTE equipment. Network resiliency is thus enhanced without introducing loss over a high-speed fiber line or trunk. Optical tributary switching, according to the present invention, is implemented in a variety of all-optical core network architectures including separate path, link-based mesh, and path-based mesh configurations. Restoration in each configuration is further achieved through space and/or wavelength switching.

II. Example Environment

The present invention is described in the example environment of a fiber communication network. Description in these terms is provided for convenience only. It is not intended that the invention be limited to application in this example environment. In fact, after reading the following description, it will become apparent to a person skilled in the relevant art how to implement the invention in alternative environments.

III. Separate Path

FIG. 1 shows a block diagram example of a separate path network configuration having optical tributary restoration switching according to the present invention. Two network nodes A and B are connected through a high-capacity fiber communications link 100 consisting of one or more working fibers 135 and protect fibers 155. For example, each of the fibers 135, 155 can consist of a single-mode fiber for a high-speed long-distance trunk line. The protect fiber 155 is provided as a back-up in the event a network failure prevents traffic flow over a working fiber 135. Depending upon the level of security, each of the protect and working fibers can be laid-out along separate physical paths or in a common cable. Additional working and/or protect fibers can also be added to increase capacity and provide redundancy.

Lightwave or Line Terminal Equipment (130, 140, 150, 160) are connected at a high-speed line side to the ends of fibers 135, 155. Path Terminal Equipment (101–108) feed and receive slower, demultiplexed optical carrier tributary signals at a tributary side of the LTEs 130–160.

According to the present invention, optical cross-connect switches (OCCS) 110 and 120 are provided for optical protection switching at the tributary side of the LTEs 130–160. At node A, optical tributary fibers 112 couple data between PTEs 101–104 and OCCS 110. Optical tributary fibers 114 couple data between OCCS 110 and the LTE 130. Optical tributary fibers 116 couple data between OCCS 110 and the LTE 150. At node B, optical tributary fibers 122 couple data between PTEs 105–108 and OCCS 120. Optical tributary fibers 124 couple data between OCCS 120 and the LTE 140. Optical tributary fibers 126 couple data between OCCS 120 and the LTE 160.

In the event of a network failure, such as a fiber cut in working fiber 135 or an LTE 130, 140 failure, each OCCS 110, 120 can switch optical signals from the optical tributary fibers 114, 124 to fibers 116, 126 under the control of OCCS switch controllers (not shown). In general, any network fault detection technique can be used to trigger this protection switching. For example, fault can be detected by electrical signal loss or degradation at a PTE. Fault detection can also be carried out within the optical domain of the network, through various techniques such as, optical power loss, OTDR measurements, loss of pilot tone, and use of a dedicated port and/or wavelength.

In addition, the OCCS controller can include a system processor for monitoring the OCCS switch state and issuing switch commands. Specific software and/or hardware implementations for addressing, monitoring, and controlling an OCCS based on the number of ports and switch configurations would be apparent to one skilled in the art. Further, OCCS controllers can be provided at each node. For restoration and network management purposes, each OCCS controller is further coupled to a separate Digital Communication Network (DCN) and/or to an Operational Support System (OSS). The DCN is an ultra-reliable data network which is provided for communicating status signaling messages between nodes regarding system operation, faults, etc. The Operational Support System is a centralized network manager which oversees global network operations. See, e.g., the commonly-assigned U.S. patent application, Ser. No. 08/580,391, Attorney Docket No. 1575.0310000, by Shoa-Kai Liu, entitled "A Method and System for Detecting Optical Faults Within the Optical Domain of a Fiber Communication Network," incorporated above by reference.

OCCS 110, 120 can be any type of multi-port optical cross-connect switch. In principle for a N×N OCCS any number of ports, e.g. N=4, 8, 16, 40, 72, 128, or 256) can be switched. Any type of optical switch can be used depending upon the available technology. See, e.g., the integrated directional-coupler type switches discussed by Waynant, R.

et al., Eds., *Electro-Optics Handbook*, McGraw-Hill, Inc. U.S.A. (1994), chapter 26, and especially page 26.34 (incorporated herein by reference). For example, OCCS 106 can consist of a 16×16 LiNbO$_3$ switch (N=16). Sixteen ports are then available on each OCCS face 106A, 106B for switching optical tributary signals. Other suitable optical switching technologies include switches based on a thermo-optic effect in polymer waveguides or silica glass, semiconductor amplification, piezo movement, and integrated indium phosphide.

In addition, while a single, multi-port OCCS is shown schematically for clarity, multiple discrete switches and couplers can be used to perform optical switching. For example, a set of discrete 1×2 or 2×2 optical switches can used to switch individual tributary signals between working and protect tributary fibers 114, 124. Y-couplers and directional couplers can be used.

In a preferred configuration, OCCS 110 and tributary fibers 112, 114, and 116 are included at or near a common central office. OCCS 120 and tributary fibers 122, 124, and 126 are likewise located at or near another central office site. In this way, any loss introduced into the optical tributary side of the network is easily controlled and corrected. Tributary fibers can be shortened. A lightwave amplifier (LA) or regenerator (LRE) can be added along the fibers to boost signal quality. In any event, the insertion of the OCCS 110 or 120 does not adversely impact optical signal transmission at the line side.

The present invention is not limited to a particular type of LTE or PTE. As would be apparent to a person skilled in the art given the above description, many types of line or lightwave terminal equipment and path terminal equipment can be used in a variety of architectures. For example, in a SONET (or Synchronous Digital Hierarchy SDH) communications network, PTEs 103, 104 can each output optical carrier (OC) signals to the working or protect tributary fibers 112. A LTE 130 or 150 then multiplexes the individual OC signals into a single higher-speed OC signal. For example, in FIG. 1, two OC-12 signals having a data rate 622.080 Mb/s can be multiplexed in LTE 130 or 150 into an OC-24 signal having twice the data rate 1.244 Gb/s. See, e.g., the background discussion of Digital Transmission Systems and Fiber Optic Technology and Transmission Systems in Minoli, D., "Telecommunications Technology Handbook," Artech House: Norwood, Mass.), chapters 3 and 7 (1995) (incorporated in its entirety by reference herein).

Preferably, the fiber link 100 carries an OC-192 signal (9.952 Gb/s). This can be generated by multiplexing four optical tributary OC-48 signals (2.488 Gb/s). To obtain the four OC-48 signals, further multiplexing and switching at the tributary side can occur. Four OC-12 signals can be multiplexed to produce each OC-48 signal. Ultimately, 192 electrical signals are converted to optical carrier signals at PTEs and/or LTEs and multiplexed; for example, 192 DS3s signals can be multiplexed to 16 OC-12s, to four OC-48s, to one OC-192 optical signal.

FIG. 1 further shows a fully-redundant fiber system on both the line and tributary sides of the network. In practice, a few protect fibers provides sufficient back-up capacity for multiple working fibers. Thus, many more working fibers 135 can be used compared to the number of protect fibers 155. The tributary fibers 112–116 and 122–126 can also have fewer protect fibers (i.e. one fiber) than working fibers.

In general, the number of tributary fibers, discrete switches and/or OCCS switch port counts can be increased to accommodate a variety of network architectures. Bi-directional fibers are shown in FIG. 1 for convenience. Uni-directional fibers can also be used.

IV. Link-Based Mesh Restoration

In a network mesh architecture, restoration can occur by re-routing traffic around a failed link between adjacent nodes. According to one embodiment of the present invention, optical tributary switching is performed on a link basis to avoid fiber failure, cable cut, nodal failure and other system errors. Space and/or wavelength division can be used to provide network protection. In a space division architecture, traffic is switched between different optical tributary fibers leading to physically diverse links. Wavelength division provides an extra degree of freedom for switching optical tributary traffic.

A. Link Mesh Space

Figure 2:
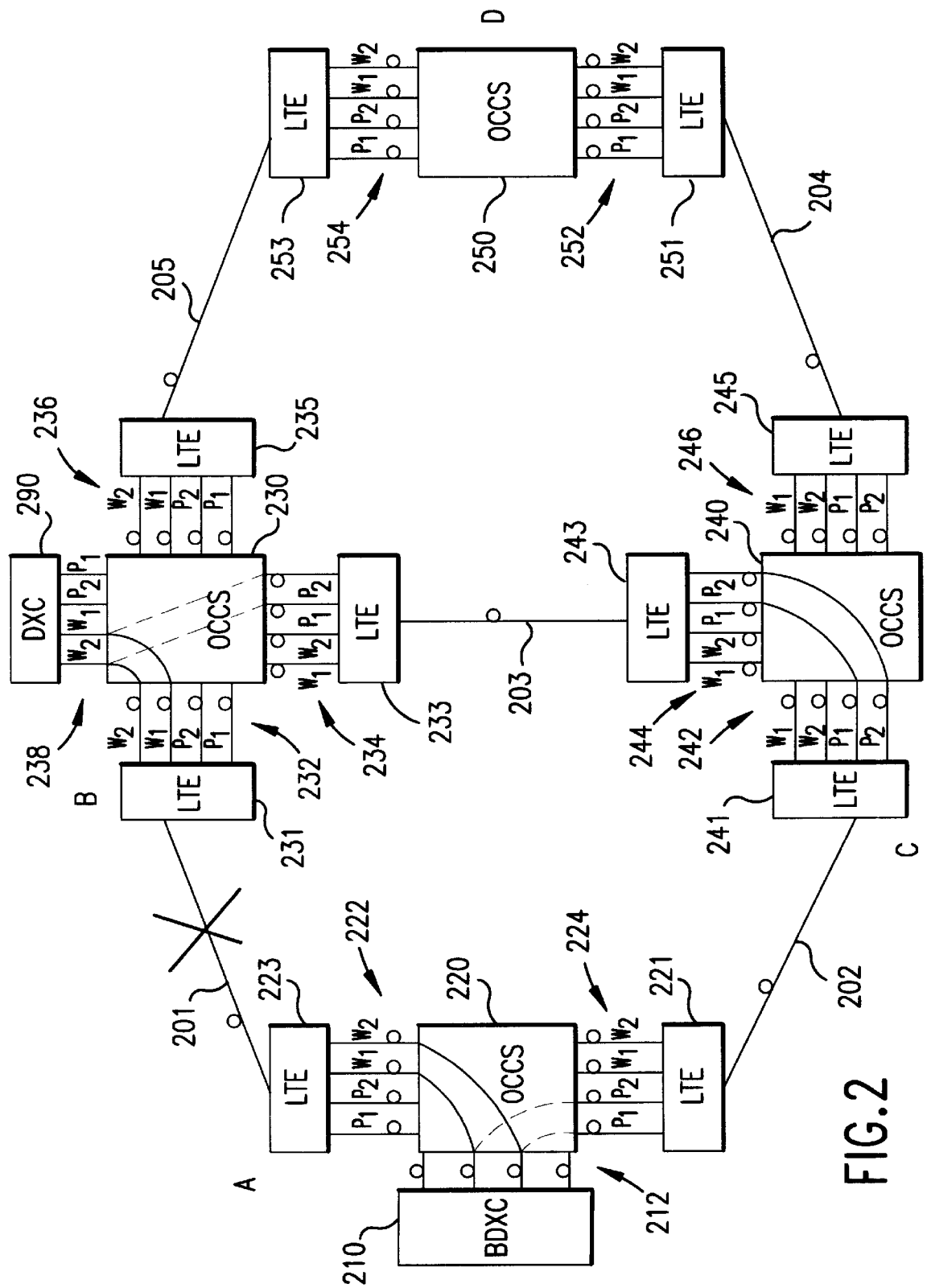
FIG. 2 is a block diagram of a link-based mesh space network configuration having optical tributary restoration switching according to the present invention.

FIG. 2 is a block diagram of a link mesh space network configuration having optical tributary restoration switching according to the present invention. Five high-speed fiber links 201–205 are shown interconnecting four nodes A to D. High speed outputs from LTEs (221, 223, 231, 233, 235, 241, 243, 245, 251, and 253) are connected to respective ends of the fiber links 201–205.

According to the present invention, optical cross-connect switches (OCCS) 220–250 are provided at each node (A to D) for optical protection switching at the tributary side of the LTEs. At node A, optical carrier signals are input and output of node A along optical tributary fibers 212. For example, a Broadband Digital Cross-Connect (BB-DXC) 210 can be optically coupled to OCCS 220 through the tributary fibers 212. OCCS 220 switches between different sets of optical tributary working and/or protect fibers 222, 224 leading to different respective LTEs 221, 223 and fiber links 201, 202.

Nodes B to D are similar to node A. Node B and C however are shown with an extra degree of freedom. At node B, optical carrier signals are input and output along optical tributary fibers 238 to a Broadband Digital Cross-Connect (BB-DXC) 290. OCCS 230 switches between different sets of optical tributary working and/or protect fibers 232, 234, 236 leading to different respective LTEs 231, 233, 235 and fiber links 201, 203, and 205.

At node C, OCCS 240 switches between different sets of optical tributary working and/or protect fibers 242, 244, 246 leading to different respective LTEs 241, 243, 245 and fiber links 202, 203, and 204. Optical carrier signals can be further input and output from node C along another set of optical tributary fibers to a Broadband Digital Cross-Connect (not shown).

At node D, OCCS 250 switches between different sets of optical tributary working and/or protect fibers 252, 254 leading to different respective LTEs 251, 253 and fiber links 204, 205. Optical carrier signals can be further input and output from node D along another set of optical tributary fibers to a Broadband Digital Cross-Connect (not shown).

In the event of a failure of link 201 as indicated by the X (i.e. a fiber failure, cable cut, or nodal LTE failure), OCCS 220–240 are switched under the control of respective OCCS controllers (not shown) to form an optical back-up restoration path along links 202 and 203. In this way, network link integrity is assured without having to use redundant fibers at each link. Spare capacity must be reserved in network links to accommodate restoration, however, this can be cheap compared to adding or reserving additional long-distance protect fibers between nodes.

B. Link Mesh Wavelength

Figure 3:
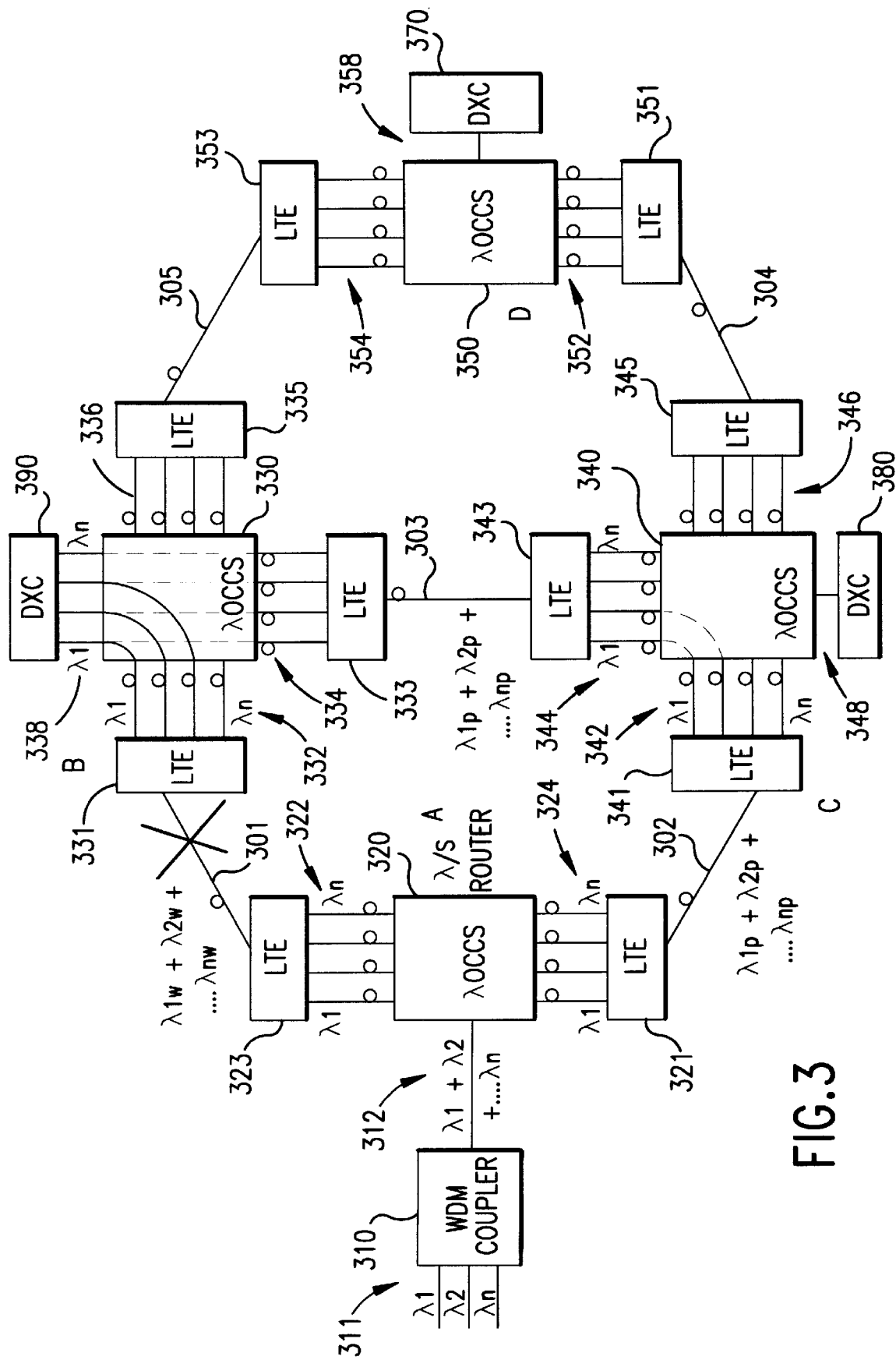
FIG. 3 is a block diagram of a link-based mesh wavelength network configuration having optical tributary restoration switching according to the present invention.

FIG. 3 is a block diagram of a link mesh wavelength network configuration having optical tributary restoration switching according to the present invention. Five high-speed fiber links 301–305 are shown interconnecting four nodes A to D. High speed outputs from LTEs (321,323,

331,333, 335, 341, 343, 345, 351, and 353 ) are connected to respective ends of the fiber links 301–305.

According to the present invention, an optical cross-connect switch (OCCS) 320–350 is provided at each node (A to D) for optical protection switching at the tributary side of the LTEs. At node A, optical carrier WDM signals ($\lambda_1 \ldots \lambda_n$) are input and output of node A along optical tributary fibers 312. For example, a WDM coupler 310 can be optically coupled to OCCS 320 through the tributary fibers 312.

WDM coupler 310 multiplexes and/or demultiplexes incoming or outgoing signals 311 at different wavelengths. WDM couplers and routers for use in a WDM fiber network are generally well-known. See, e.g., Brackett, C., "Dense Wavelength Division Multiplexing Networks: Principles and Applications," *I.E.E.E. Journal on Selected Areas in Communications*, vol. 8, No. 6, pp. 948–64 (August 1990).

OCCS 320 switches between different sets of optical tributary fibers 322, 324 leading to different respective LTEs 321, 323 and fiber links 301, 302. Each optical tributary fiber carries a respective optical carrier signal at a particular wavelength ($\lambda_l$ to $\lambda_n$) Subscripts w and p are added in FIG. 3 to indicate that the optical carrier signals are traveling over working and protect links respectively.

Nodes B to D are similar to node A. Node B and C however are shown with an extra degree of freedom. At node B, optical carrier signals are input and output along optical tributary fibers 338 to a Broadband Digital Cross-Connect (BB-DXC) 390. OCCS 330 switches between different sets of optical tributary fibers 332, 334, 336 leading to different respective LTEs 331, 333, 335 and fiber links 301, 303, and 305.

At node C, OCCS 340 switches between different sets of optical tributary fibers 342, 344, 346 leading to different respective LTEs 341, 343, 345 and fiber links 302, 303, and 304. Optical carrier signals can be further input and output from node C along another set of optical tributary fibers 348 to a Broadband Digital Cross-Connect (380).

At node D, OCCS 350 switches between different sets of optical tributary fibers 352, 354 leading to different respective LTEs 351, 353 and fiber links 304, 305. Optical carrier signals can be further input and output from node D along another set of optical tributary fibers 358 to a Broadband Digital Cross-Connect (370). Further, WDM couplers and routers can be provided at each node A to D depending on the wavelength and/or space division used in routing signals through the optical tributary fibers.

In the event of a failure of link 301 (i.e. a fiber failure, cable cut, or nodal LTE failure), OCCS 320–340 are switched under the control of OCCS controllers (not shown) to form an optical back-up restoration path along links 302 and 303. In this way, network link integrity is assured without having to use redundant fibers at each link. Spare capacity must be reserved in network links to accommodate restoration, however, this can be cheap compared to adding or reserving additional long-distance protect fibers between nodes.

Using multiple wavelengths allows an extra degree of freedom in restoration. For example, when only one wavelength fails over a link, traffic across an otherwise valid link can be switched to another wavelength through the control of OCCS 320–350.

OCCSs 320–350 can also be switched to allow wavelength re-use. When first network data at one wavelength encounters a link already sending second network data at that wavelength, the first network data can be switched to a second wavelength to avoid conflict.

Restoration for the separate path or link-based space or wavelength mesh architectures can be implemented using standard techniques. For instance, distributed restoration algorithms (DRA) can be used to allow real-time fault determination and flexible network restoration. For example, sender nodes can broadcast a break indication which is then detected and acknowledged by receiving chooser nodes which indicate they are free for use in restoration. A link for restoring communication such as link 202, 203 is then established. See, e.g., the Grover article referenced above and incorporated herein by reference. Alternatively, pre-determined restoration link tables can be stored for each node to allow quick switching of traffic to a back-up link 202, 203. Each node A to D can also have varying, additional degrees of freedom—making the network more resilient but increasing the complexity of restoration operations.

V. Path-Based Mesh Restoration

In a network mesh architecture, restoration can occur by re-routing traffic around a failed link or path between adjacent nodes. According to the present invention, optical tributary switching is performed on a path basis to avoid fiber failure, cable cut, nodal failure and other system errors. Pre-determined paths are formed between network endpoints. Each path can consist of one or more individual links between nodes. A failure along a predetermined working path can be avoided by switching traffic to pre-determined back-up path between the same endpoints.

Space and/or wavelength division can be used to provide network protection as described earlier in the link-based mesh examples. In a space division architecture, traffic is switched between different optical tributary fibers leading to physically diverse paths. Wavelength division provides an extra degree of freedom for switching optical tributary traffic.

A. Path Mesh Space

Figure 4:
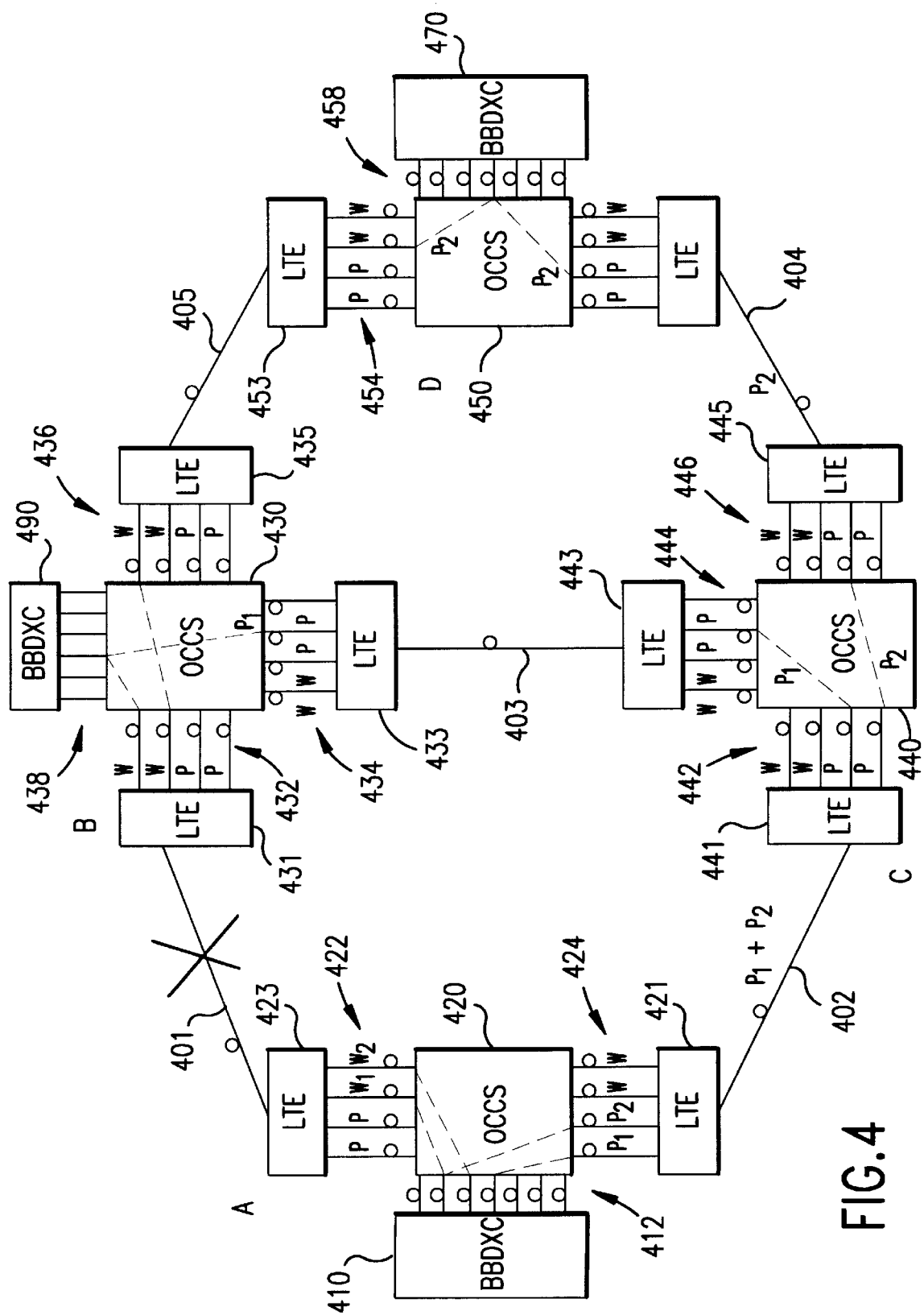
FIG. 4 is a block diagram of a path-based mesh space network configuration having optical tributary restoration switching according to the present invention.

FIG. 4 is a block diagram of a path mesh space network configuration having optical tributary restoration switching according to the present invention. Five high-speed fiber links 401–405 are shown interconnecting four nodes A to D. High speed outputs from LTEs (421, 423, 431, 433, 245, 441, 443, 445, 451, and 453) are connected to respective ends of the fiber links 401–405.

According to the present invention, an optical cross-connect switch (OCCS) 420–450 is provided at each node (A to D) for optical protection switching at the tributary side of the LTEs. At node A, optical carrier signals are input and output of node A along optical tributary fibers 412. For example, a Broadband Digital Cross-Connect (BB-DXC) 410 can be optically coupled to OCCS 420 through the tributary fibers 412. OCCS 420 switches between different sets of optical tributary working and/or protect fibers 422, 424 leading to different respective LTEs 421, 423 and fiber links 401, 402.

Nodes B to D are similar to node A. Node B and C however are shown with an extra degree of freedom. At node B, optical carrier signals are input and output along optical tributary fibers 438 to a Broadband Digital Cross-Connect (BB-DXC) 490. OCCS 430 switches between different sets of optical tributary working and/or protect fibers 432, 434, 436 leading to different respective LTEs 431, 433, 435 and fiber links 401, 403, and 405.

At node C, OCCS 440 switches between different sets of optical tributary working and/or protect fibers 442, 444, 446 leading to different respective LTEs 441, 443, 445 and fiber links 402, 403, and 404. Optical carrier signals can be further input and output from node C along another set of optical tributary fibers to a Broadband Digital Cross-Connect (not shown).

At node D, OCCS 450 switches between different sets of optical tributary working and/or protect fibers 452, 454 leading to different respective LTEs 451, 453 and fiber links 404, 405. Optical carrier signals can be further input and output from node D along another set of optical tributary fibers 458 to a Broadband Digital Cross-Connect (470).

In the event of a failure of a link 401 (i.e. a fiber failure, cable cut, or nodal LTE failure), OCCS 420–450 are switched under the control of OCCS controllers (not shown) to form an optical back-up restoration path along links 402 and/or 404. In this way, network path link integrity is assured without having to use redundant fibers at each link. Spare capacity must be reserved in network links to accommodate restoration, however, this can be inexpensive compared to adding or reserving additional long-distance protect fibers between nodes. By using multiple paths between endpoint nodes, greater restoration flexibility and resilience is obtained. For example, a working path between nodes A and C might consist of links 401 and 405. Links 402 and 404 can then form a first back-up path. Other intermediate nodes and links can be used in paths through larger hierarchial networks.

B. Path Mesh Wavelength

Figure 5:
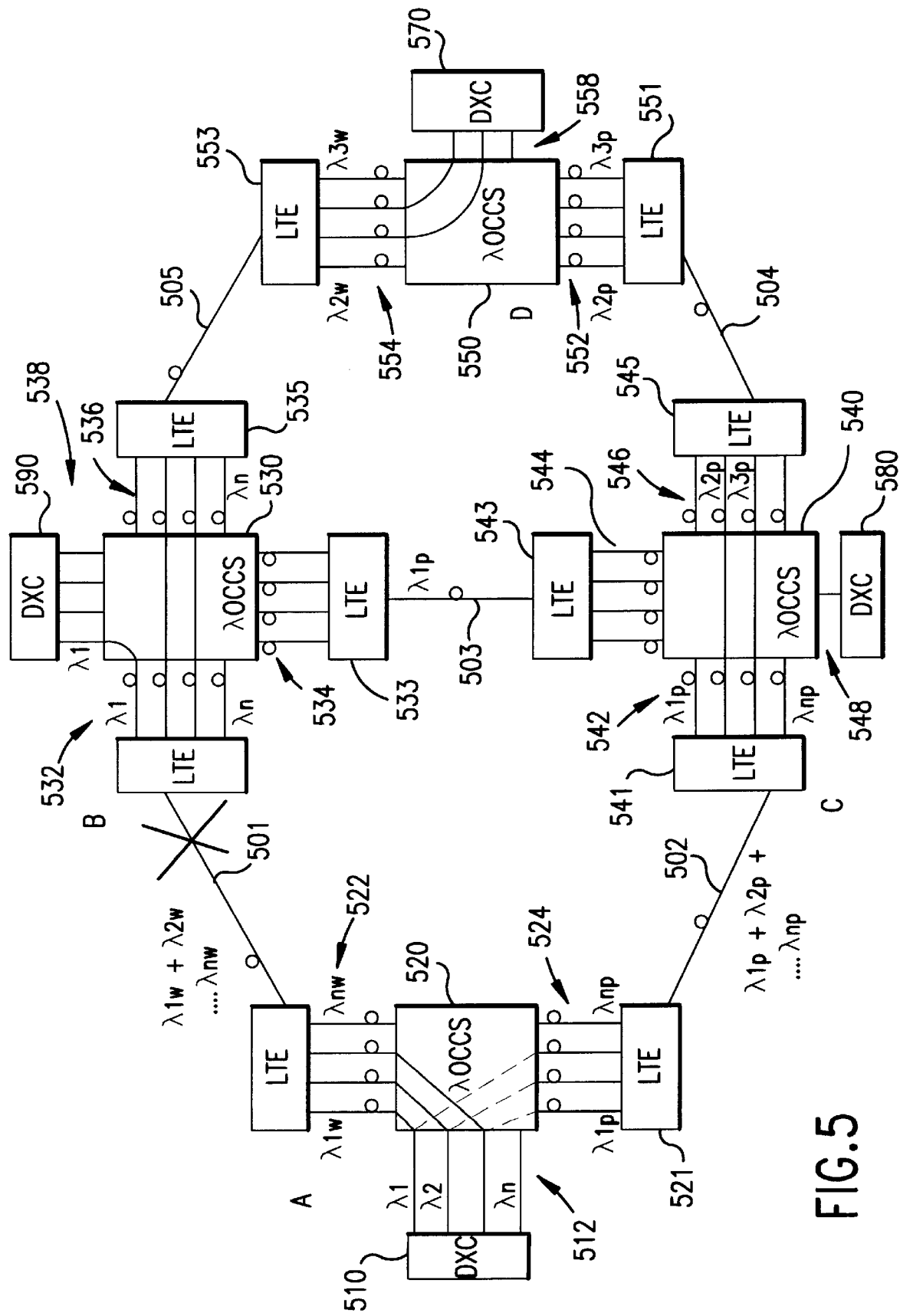
FIG. 5 is a block diagram of a path-based mesh wavelength network configuration having optical tributary restoration switching according to the present invention.

FIG. 5 is a block diagram of a path mesh wavelength network configuration having optical tributary restoration switching according to the present invention. Five high-speed fiber links 501–505 are shown interconnecting four nodes A to D. High speed outputs (e.g. OC-192 signals) from LTEs (521, 523, 531, 533, 535, 541, 543, 545, 551, and 553) are connected to respective ends of the fiber links 501–505.

According to the present invention, an optical cross-connect switch (OCCS) 520–550 is provided at each node (A to D) for optical protection switching at the tributary side of the LTEs. At node A, optical carrier WDM signals are input and output of node A along optical tributary fibers 512. For example, a WDM coupler 510 can be optically coupled to OCCS 320 through the tributary fibers 312. WDM coupler 350 multiplexes and/or demultiplexes incoming or outgoing signals 511 at different wavelengths.

OCCS 520 switches between different sets of optical tributary fibers 522, 524 leading to different respective LTEs 521, 523 and fiber links 501, 502. Each optical tributary fiber carries optical carrier signals at a particular wavelength ($\lambda_1$ to $\lambda_n$).

Nodes B to D are similar to node A. Node B and C however are shown with an extra degree of freedom. At node B, optical carrier signals are input and output along optical tributary fibers 538 to a Broadband Digital Cross-Connect (BB-DXC) 590. OCCS 530 switches between different sets of optical tributary fibers 532, 534, 536 leading to different respective LTEs 531, 533, 535 and fiber links 501, 503, and 505.

At node C, OCCS 540 switches between different sets of optical tributary fibers 542, 544, 546 leading to different respective LTEs 541, 543, 545 and fiber links 502, 503, and 504. Optical carrier signals can be further input and output from node C along another set of optical tributary fibers 548 to a Broadband Digital Cross-Connect (580).

At node D, OCCS 550 switches between different sets of optical tributary fibers 552, 554 leading to different respective LTEs 551, 553 and fiber links 504, 505. Optical carrier signals can be further input and output from node D along another set of optical tributary fibers 558 to a Broadband Digital Cross-Connect (570). Further WDM couplers and routers can be provided at each node A to D depending on the wavelength and/or space division used in routing signals through the optical tributary fibers.

In the event of a failure of link 501 (i.e. a fiber failure, cable cut, or nodal LTE failure), OCCS 520–540 are switched under the control of OCCS controllers (not shown) to form an optical back-up restoration path along links 502 and 503. In this way, network link integrity is assured without having to use redundant fibers at each link. Spare capacity must be reserved in network links to accommodate restoration, however, this can be cheap compared to adding or reserving additional long-distance protect fibers between nodes.

Using multiple wavelengths allows an extra degree of freedom in restoration. For example, when only one wavelength fails over a link, traffic across an otherwise valid link can be switched to another wavelength through the control of OCCS 520–550.

OCCSs 520–550 can also be switched to allow wavelength re-use. When first network data at one wavelength encounters a link already sending second network data at that wavelength, the first network data can be switched to a second wavelength to avoid conflict.

Restoration for the path-based space and/or wavelength architectures can be implemented using standard real-time (e.g. DRA) or predetermined path determination techniques as described earlier.

As would be apparent to one skilled in the art given the above description, various types of working and/or protect fibers, optical cross-connect switches, WDM couplers and routers, LTEs, and PTEs can be used. For each of the above link-based and path-based mesh arrangements described in FIGS. 2 to 5, the number of tributary fibers, discrete switches and/or switch port counts can be increased to accommodate larger network architectures. Bi-directional or uni-directional fibers can be used.

As described before with respect to FIG. 1, each OCCS in FIGS. 2 to 5 can be any type of multi-port optical cross-connect switch. In principle for a N×N OCCS any number of ports, e.g. N=4, 8, 16, 40, 72, 128, or 256) can be switched. Any type of optical switch can be used depending upon the available technology. Suitable types of optical switching technology include switches based on a thermo-optic effect in polymer waveguides or silica glass, semiconductor amplification, piezo movement, integrated lithium niobate, and integrated indium phosphide.

In addition, while a single, multi-port OCCS is shown schematically for clarity in the above link-based and path-based examples, multiple discrete switches and couplers can be used to perform optical switching. For example, a set of discrete 1×2 or 2×2 optical switches can used to switch individual tributary signals between working and protect tributary fibers. Y-couplers and directional couplers can also be used.

Like the separate path configuration, the link-based and path-based embodiments of the present invention are not limited to a particular type of LTE or PTE. As would be apparent to a person skilled in the art given the above description, many types of line or lightwave terminal equipment and path terminal equipment can be used in a variety of architectures. For example, in a SONET (or Synchronous Digital Hierarchy SDH) communications network, PTEs (not shown in FIGS. 2–5 for clarity) can each output optical carrier (OC) signals to the working or protect tributary fibers. The LTEs then multiplex the individual OC tributary signals into a single higher-speed OC signal, e.g. OC-192.

VI. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A fiber communication network having first and second nodes optically connected by at least one working fiber and at least one protect fiber, wherein first ends of each at least one working fiber and at least one protect fiber are connected to the first node and wherein second ends of each at least one working fiber and at least one protect fiber are connected to the second node, comprising:

first and second lightwave terminal elements connected respectively on a line side to the first ends of each at least one working fiber and at least one protect fiber at the first node;

third and fourth lightwave terminal elements connected respectively on a line side to the second ends of each at least one working fiber and at least one protect fiber at the second node;

a first optical cross-connect tributary switch optically coupled on a tributary side to said first and second lightwave terminal elements for switching between optical tributary paths connected to said first and second lightwave terminal elements; and a second optical cross-connect tributary switch optically coupled on a tributary side to said third and fourth lightwave terminal elements for switching between optical tributary paths connected to said third and fourth lightwave terminal elements; wherein, said first and second optical cross-connect tributary switches can each switch an optical signal to travel through an optical tributary path such that said second or fourth lightwave terminal element multiplexes said optical signal for transport over the at least one protect fiber when the at least one working fiber is unavailable.

2. The network according to claim 1, wherein said at least one protect fiber is disposed on a separate path apart from said at least one working fiber.

3. The network according to claim 1, wherein said first optical cross-connect tributary switch comprises at least first to third sets of ports, said first set of ports being optically coupled to path terminal equipment for inputting optical carrier signals to said first optical cross-connect tributary switch, said second set of ports being optically coupled to a first set of optical tributary fibers connected to said first lightwave terminal element, and said third set of ports being optically coupled to a second set of optical tributary fibers connected to said second lightwave terminal element.

4. The network according to claim 3, wherein said second optical cross-connect tributary switch comprises at least fourth to sixth sets of ports, said fourth set of ports being optically coupled to path terminal equipment for outputting optical carrier signals, from said second optical cross-connect switch, said fifth set of ports being optically coupled to a third set of optical tributary fibers connected to said third lightwave terminal element, and said sixth set of ports being optically coupled to a fourth set of optical tributary fibers connected to said fourth lightwave terminal element.

5. The network of claim 3, wherein said first and second sets of optical tributary fibers each comprise at least one of working and protect fibers.

6. The network of claim 1, wherein said first and second optical cross-connect switches each comprise a multiple-port, integrated optical switch.

7. The network of claim 1, wherein said first and second optical cross-connect switches each comprise a plurality of discrete optical switches.

8. The network of claim 1, wherein said first and second nodes are connected to additional nodes in a mesh network.

9. A communication network having a plurality of nodes interconnected by fiber links, comprising:

a first node connected to first and second fiber links, said first node including first and second optical tributary paths;

first and second lightwave terminal elements (LTEs) connected respectively between said first and second fiber links and said first and second optical tributary paths; and a first optical cross-connect tributary switch for switching between said first and second optical tributary paths, such that an optical signal input to said first node travels through said second optical tributary path to said second lightwave terminal element for transport over the second fiber link when the first fiber link is unavailable.

10. The network according to claim 9, further including a second node, said first and second nodes being interconnected by said first link and said second link, wherein said first fiber link comprises a working link and said second fiber link comprises a protect link.

11. The network of claim 10, wherein said working link directly connects said first and second nodes, and said protect link directly connects said first node to at least one intermediate node between said first and second nodes.

12. The network according to claim 9, wherein said first and second optical tributary comprise respective first and second sets of optical tributary fibers including at least one of working and protect fibers.

13. The network of claim 9, wherein said first optical cross-connect tributary switch comprises a multiple-port, integrated optical switch.

14. The network of claim 9, wherein said first optical cross-connect tributary switch comprises a plurality of discrete optical switches.

15. The network of claim 9, further comprising:

a wavelength division multiplexing coupler for optically coupling optical carrier signals at multiple wavelengths to said first optical cross-connect tributary switch.

16. The network of claim 9, wherein said first optical cross-connect tributary switch includes a wavelength router for routing different wavelengths through different fibers along said first and second optical tributary paths.

17. The network of claim 9, further including a second node, said first and second nodes being connected through first and second paths;

wherein at least a portion of said first and second paths comprise said first and second fiber links.

18. A method for restoring an optical network, comprising:

inputting optical carrier tributary signals at a first node;

optically switching said optical carrier tributary signals through first and second sets of optical tributary fibers depending upon a network condition;

multiplexing said switched optical carrier tributary signals to form an optical carrier line signal; and outputting said optical carrier line signal from said first node toward a second node in the network.

19. The method of claim 18, wherein said network condition comprises at least one of a fiber failure, cable cut, or nodal failure which renders a first working fiber link to the first node unavailable.

20. The method of claim 18, further comprising the step of wavelength division multiplexing said optical carrier tributary signals input to said first node.

* * * * *